US012741523B2

(12) United States Patent
Harsch et al.

(10) Patent No.: US 12,741,523 B2
(45) Date of Patent: Sep. 22, 2026

(54) MOTOR VEHICLE WITH A DRIVE ENERGY ACCUMULATOR

(71) Applicant: Bayerische Motoren Werke Aktiengesellschaft, Munich (DE)

(72) Inventors: Thomas Harsch, Munich (DE); Michael Kreitz, Haimhausen (DE); Julian Patscheider, Munich (DE); Moritz Rittereiser, Munich (DE); Hadar Sleiman, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 279 days.

(21) Appl. No.: 18/576,411

(22) PCT Filed: Jul. 18, 2022

(86) PCT No.: PCT/EP2022/069975
§ 371 (c)(1),
(2) Date: Jan. 4, 2024

(87) PCT Pub. No.: WO2023/001725
PCT Pub. Date: Jan. 26, 2023

(65) Prior Publication Data

US 2024/0308322 A1 Sep. 19, 2024

(30) Foreign Application Priority Data

Jul. 23, 2021 (DE) ..................... 10 2021 119 156.4

(51) Int. Cl.
*B60K 1/04* (2019.01)
*B60H 1/00* (2006.01)
(Continued)

(52) U.S. Cl.
CPC ........... *B60K 1/04* (2013.01); *B60H 1/00392* (2013.01); *B60H 1/143* (2013.01); *B60K 11/04* (2013.01);
(Continued)

(58) Field of Classification Search
CPC .... B60K 1/04; B60K 11/04; B60K 2001/005; B60K 2001/0438; B60K 2001/0433;
(Continued)

(56) References Cited

U.S. PATENT DOCUMENTS 7,997,368 B2 * 8/2011 Takasaki ................. B60L 50/64 180/68.5
8,397,853 B2 * 3/2013 Stefani .................... B60L 50/16 180/68.5
(Continued)

FOREIGN PATENT DOCUMENTS

CN 111452673 A * 7/2020 .............. B60L 58/27
DE 10 2010 030 892 A1 1/2012
(Continued)

OTHER PUBLICATIONS

Translated copy of DE-102018133006-A1 (Year: 2025).*
(Continued)

*Primary Examiner* — James A Shriver, II
*Assistant Examiner* — Ian Bryce Shelton
(74) *Attorney, Agent, or Firm* — Crowell & Moring LLP

(57) ABSTRACT

A passenger motor vehicle has a body with a passenger compartment, and a drive energy accumulator, in particular a drive energy battery. The drive energy accumulator is arranged or mounted on the body from below and at least part of it forms a floor of the passenger compartment. The motor vehicle also has a temperature-control system, and the part of the drive energy store forming the floor of the passenger compartment is designed as a heat exchanger for
(Continued)

controlling the temperature of the passenger compartment by way of the temperature-control system.

12 Claims, 3 Drawing Sheets

(51) Int. Cl.
*B60H 1/14* (2006.01)
*B60K 1/00* (2006.01)
*B60K 11/04* (2006.01)
*B62D 21/15* (2006.01)

(52) U.S. Cl.
CPC ............... *B60H 2001/00221* (2013.01); *B60K 2001/005* (2013.01); *B60K 2001/0438* (2013.01); *B62D 21/15* (2013.01)

(58) Field of Classification Search
CPC ...... B60K 1/00; B60H 1/00392; B60H 1/143; B60H 2001/00221; B60H 1/00278; B60H 1/00321; B60H 2001/00307; B62D 21/15
See application file for complete search history.

(56) References Cited

U.S. PATENT DOCUMENTS 9,054,402 B1 * 6/2015 Rawlinson .............. F41H 5/013
9,397,376 B2 * 7/2016 Rawlinson ........ H01M 10/6556
9,440,523 B2 * 9/2016 Decker .................... B60K 1/04
9,731,577 B2 * 8/2017 Johnston ............ B60H 1/00921
10,476,051 B2 * 11/2019 Mardall .............. H01M 10/658
12,472,796 B2 * 11/2025 Zhang ................ B60H 1/00392
2009/0236162 A1 * 9/2009 Takasaki ............. H01M 50/227 180/68.5
2010/0163322 A1 * 7/2010 Stefani .................... B60L 50/16 180/68.5
2012/0003910 A1 * 1/2012 Richter ............. B60H 1/00385 454/141
2012/0312614 A1 * 12/2012 Fujiwara ............. H01M 50/209 180/68.5
2014/0020968 A1 * 1/2014 Ikeya ...................... B60L 58/30 180/65.31
2014/0193683 A1 * 7/2014 Mardall ................... B60K 1/04 429/99
2015/0135940 A1 * 5/2015 Rawlinson .......... H01M 10/625 89/36.08
2015/0171485 A1 * 6/2015 Rawlinson ............. B60L 50/64 429/62
2015/0311572 A1 * 10/2015 Sung ........................ C09K 5/06 429/62
2015/0336452 A1 * 11/2015 Decker .................. B62D 25/20 180/68.5
2016/0107504 A1 * 4/2016 Johnston ........... B60H 1/32284 165/202
2017/0214008 A9 * 7/2017 Mardall .............. H01M 50/249
2021/0229523 A1 * 7/2021 Terai ........................ B60H 1/22
2024/0116327 A1 * 4/2024 Zhang ................ B60H 1/00899

FOREIGN PATENT DOCUMENTS

DE 10 2014 107 388 A1 11/2015
DE 102016009969 A1 * 2/2017 .......... H01M 50/249
DE 10 2015 220 253 A1 4/2017
DE 102016102531 A1 * 8/2017 .......... H01M 10/625
DE 102018133006 A1 * 6/2020 .............. B60L 50/64
IT BO 20090015 A1 7/2010
JP H05178070 A * 7/1993 .............. B60L 50/64

OTHER PUBLICATIONS

International Search Report (PCT/ISA/210) issued in PCT Application No. PCT/EP2022/069975 dated Nov. 11, 2022 with English translation (5 pages).
German-language Written Opinion (PCT/ISA/237) issued in PCT Application No. PCT/EP2022/069975 dated Nov. 11, 2022 with English translation (8 pages).
German-language Search Report issued in German Application No. 10 2021 119 156.4 dated Jun. 15, 2022 with partial English translation (10 pages).

* cited by examiner

MOTOR VEHICLE WITH A DRIVE ENERGY ACCUMULATOR

BACKGROUND AND SUMMARY

The present invention relates to a motor vehicle with a body and a drive energy accumulator.

A motor vehicle with an electric drive usually has a drive battery which has a drive battery housing in which battery modules or battery cells, an electrical system/electronic system and a cooling device are arranged. The drive battery housing is in turn fitted to a vehicle body under a floor subassembly. The known drive battery housing consists, for example, of aluminum and has lateral members, a cover and a floor. The lateral members are embodied, for example, as extruded profiles or cast parts.

Furthermore, a motor vehicle, in particular a passenger motor vehicle with an electric drive, usually has an air-conditioning system for controlling the climate of a passenger compartment. Here, climate-controlled air is blown into the passenger compartment via air vents in the passenger compartment.

Proposals are also made, as known from DE102015220253A1 for example, to integrate a flat electrical heater into an interior trim of a motor vehicle.

The object of the present invention is to create a motor vehicle with a drive energy accumulator, wherein heating of a passenger compartment is configured in an improved and more efficient manner.

This object is achieved by a motor vehicle which has the features of the independent claims. Advantageous refinements of the invention are specified in the dependent claims.

A motor vehicle according to the invention, in particular a passenger motor vehicle, has a body, which has a passenger compartment, and a drive energy accumulator, in particular a drive battery. The drive energy accumulator is arranged on or fitted to the body from below and at least partially forms a floor of the passenger compartment. The motor vehicle also has a temperature-control device. Here, the part of the drive energy accumulator that forms the floor of the passenger compartment is designed as a heat exchanger for controlling the temperature of the passenger compartment by means of the temperature-control device.

Temperature control means open-loop control/closed-loop control with respect to a specific target temperature. This comprises both cooling and heating/warming up. The heat exchanger therefore forms a surface temperature-control device on the floor of the passenger compartment in the passenger compartment. Floor heating and cooling for the passenger compartment, i.e. the vehicle interior, is thus provided in a simple manner.

The temperature-control device is advantageously additionally designed to control the temperature of the drive energy accumulator. In particular, the temperature-control device is designed to control the temperature of battery cells of the drive energy accumulator. Battery cells are usually heated in the case of cold outside temperatures or cooled in the case of warm outside temperatures. The same applies to the passenger compartment, so that the temperatures of the passenger compartment and of the battery cells are controlled to the same or a similar temperature level.

The heat exchanger is preferably designed both to control the temperature of the drive energy accumulator and to control the temperature of the passenger compartment. This can save weight and installation space for the motor vehicle overall.

This is also very particularly advantageous when the battery cells adjoin, e.g. the end side of, the heat exchanger or are even cohesively connected, in particular by a layer of adhesive, to the heat exchanger.

According to a preferred development, the heat exchanger forms an upper wall of a drive energy accumulator housing of the drive energy accumulator.

Installation space in the vertical direction of the vehicle is optimally utilized in this way.

The heat exchanger preferably has a large number of channels through which a liquid temperature-control medium flows, wherein the temperature of the temperature-control medium is controlled by means of the temperature-control device.

The channels of the heat exchanger can be arranged in accordance with the counterflow principle here, i.e. the temperature-control medium flows in opposite directions in adjacent channels, so that one channel forms a forward flow and an adjacent channel forms a return flow of the temperature-control medium.

According to a preferred development of the present invention, the body has a floor assembly with a left-hand-side longitudinal member and a right-hand-side longitudinal member and also a front crossmember structure and a rear crossmember structure. The drive energy accumulator is fitted to the longitudinal members and the crossmember structures.

The floor assembly advantageously has, between the front crossmember structure and the rear crossmember structure, at least one further crossmember, in particular a seat crossmember and/or a heel plate crossmember, which is connected to the left-hand-side longitudinal member and/or to the right-hand-side longitudinal member, and/or wherein the floor assembly has, between the left-hand-side longitudinal member and the right-hand-side longitudinal member, at least one further longitudinal member, which is connected to the front crossmember structure and/or the rear crossmember structure.

The heat exchanger can form the floor of the passenger compartment between the longitudinal members and the crossmember structures here. Similarly, the heat exchanger can form the floor of the passenger compartment between the longitudinal members and the further crossmembers. Similarly, the heat exchanger can form the floor of the passenger compartment between the longitudinal members, a crossmember structure and a further crossmember.

According to a preferred development, the drive energy accumulator including the heat exchanger is designed and connected to the body in such a way that the drive energy accumulator increases a body rigidity for a driving mode of the motor vehicle and that the drive energy accumulator increases a body strength for a collision load situation.

The temperature-control device together with the heat exchanger is preferably a constituent part of a vehicle interior climate-control system which comprises yet further climate-control devices. In particular, the motor vehicle can have, in addition to the floor, i.e. the heat exchanger, as a surface heater, further surface heaters. Similarly, the motor vehicle can have an air-conditioning device by means of which temperature-controlled air is conducted into the passenger compartment via air vents.

The floor of the passenger compartment, and therefore also the heat exchanger, can also be provided with a thermally conductive floor covering or a thermally conductive floor cladding, such as an appropriate carpet.

Heat transfer from the heat exchanger to the passenger compartment is improved in this way.

Developments of the invention presented above can be combined with one another as desired as far as possible and appropriate.

BRIEF DESCRIPTION OF THE DRAWINGS

FIG. 3 schematically shows a perspective bottom view of the motor vehicle with the body, without the drive energy accumulator according to the exemplary embodiment of the present invention.

DETAILED DESCRIPTION OF THE DRAWINGS

A description of an exemplary embodiment of the invention with reference to FIGS. 1 to 5 follows.

Figure 1:
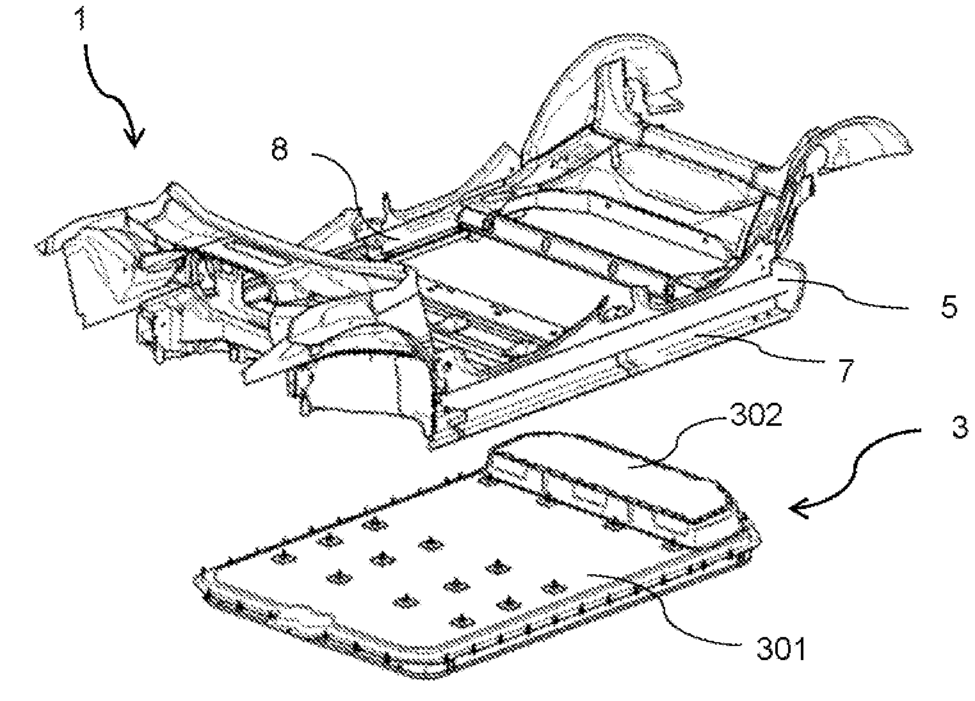
FIG. 1 schematically shows a perspective view of a motor vehicle with a body and with a drive energy accumulator before the drive energy accumulator is fitted to the body according to an exemplary embodiment of the present invention.

According to the exemplary embodiment of the present invention, a passenger motor vehicle has a body 1 and a drive energy accumulator 3. The drive energy accumulator 3 is what is known as a high-voltage battery for driving an electric drive motor of the passenger motor vehicle, i.e. a drive battery. FIG. 1 shows the state before the drive energy accumulator 3 is fitted to the body 1. The body 1 is not shown in its entirety in FIG. 1, but rather substantially only a floor assembly 5 of the body 1 is shown. The body 1 or the floor assembly 5 has a left-hand-side side sill 7 and a right-hand-side side sill 8, i.e. longitudinal members. The drive energy accumulator 3 has a drive energy accumulator housing 301, which has substantially the same height over its entire extent, and an additional housing 302 mounted thereon in the rear region of the drive energy accumulator 3. Battery cells 309 are substantially accommodated in the drive energy accumulator housing 301. For example, a charger, a converter and other electrical/electronic components are accommodated in the additional housing 302. The drive energy accumulator 3 is fitted to the floor assembly 5 from below by means of screw connections and possibly additionally by adhesive bonds.

Figure 2:
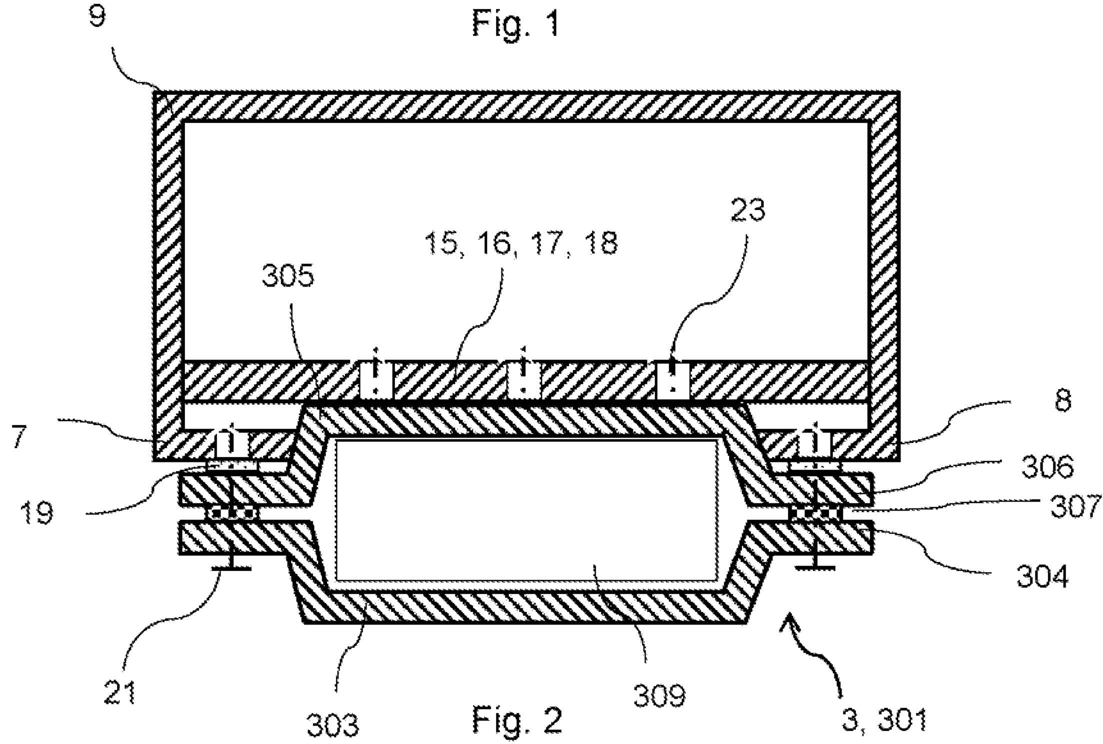
FIG. 2 schematically shows a sectional view of the motor vehicle with the body and the drive energy accumulator according to the exemplary embodiment of the present invention.

FIG. 2 shows a highly schematic sectional view along a y-direction and a z-direction of the body 1. The section runs through a passenger compartment 9 of the motor vehicle. The bottom left and the bottom right of FIG. 2 show the side sills 7, 8, the drive energy accumulator housing 301 being fitted to the side sills from below by means of screw connections 21. In particular, the drive energy accumulator housing 301, at its circumferential flange 304, 306, is fitted to the floor assembly 5 by way of a seal 19 arranged therebetween. The sectional view also schematically shows further crossmembers 15, 16, 17, 18 of the floor assembly 5. The drive energy accumulator housing 301 is connected to the further crossmembers 15, 16, 17, 18 by means of screw connections 23 and additionally adhesively bonded.

The fitted drive energy accumulator housing 301 forms, at least in sections, a base of the floor assembly 5 and extends over an entire width of the floor assembly 5 between the left-hand-side side sill 7 and the right-hand-side side sill 8. The passenger compartment 9 is sealed at the bottom by the seal 19.

FIG. 3 shows a perspective bottom view of only the floor assembly 5, without the drive energy accumulator 3. As is shown in FIG. 3, the floor assembly 5 has, behind front wheel housings or behind a front axle, a front crossmember structure 11 with what is known as a front end wall, which delimits the passenger compartment at the front in the direction of a vehicle front section, and connects front ends of the side sills 7 and 8 to each other. The floor assembly 5 also has, in front of rear wheel housings or in front of a rear axle, a rear crossmember structure 13, which connects rear ends of the side sills 7 and 8 to each other and which is arranged in the region of a rear backseat bench, not shown, which forms a second row of seats of the motor vehicle. The floor assembly 5 also has further crossmembers, such as the seat crossmembers 15, 16, 17, between the front crossmember structure 11 and the rear crossmember structure 13 in the region of a row of front seats and a B-pillar of the body 1. A heel plate crossmember 18 is arranged in the region of the rear row of seats. All the crossmembers 15, 16, 17, 18 run between the left-hand-side side sill 7 and the right-hand-side side sill 8 and are connected to them. The region between the side sills 7 and 8 and the respective crossmember structures 11 and 13 or the further crossmembers 15, 16, 17, 18 is open. The floor assembly 5 is formed without a floor plate between these members.

Figure 4:
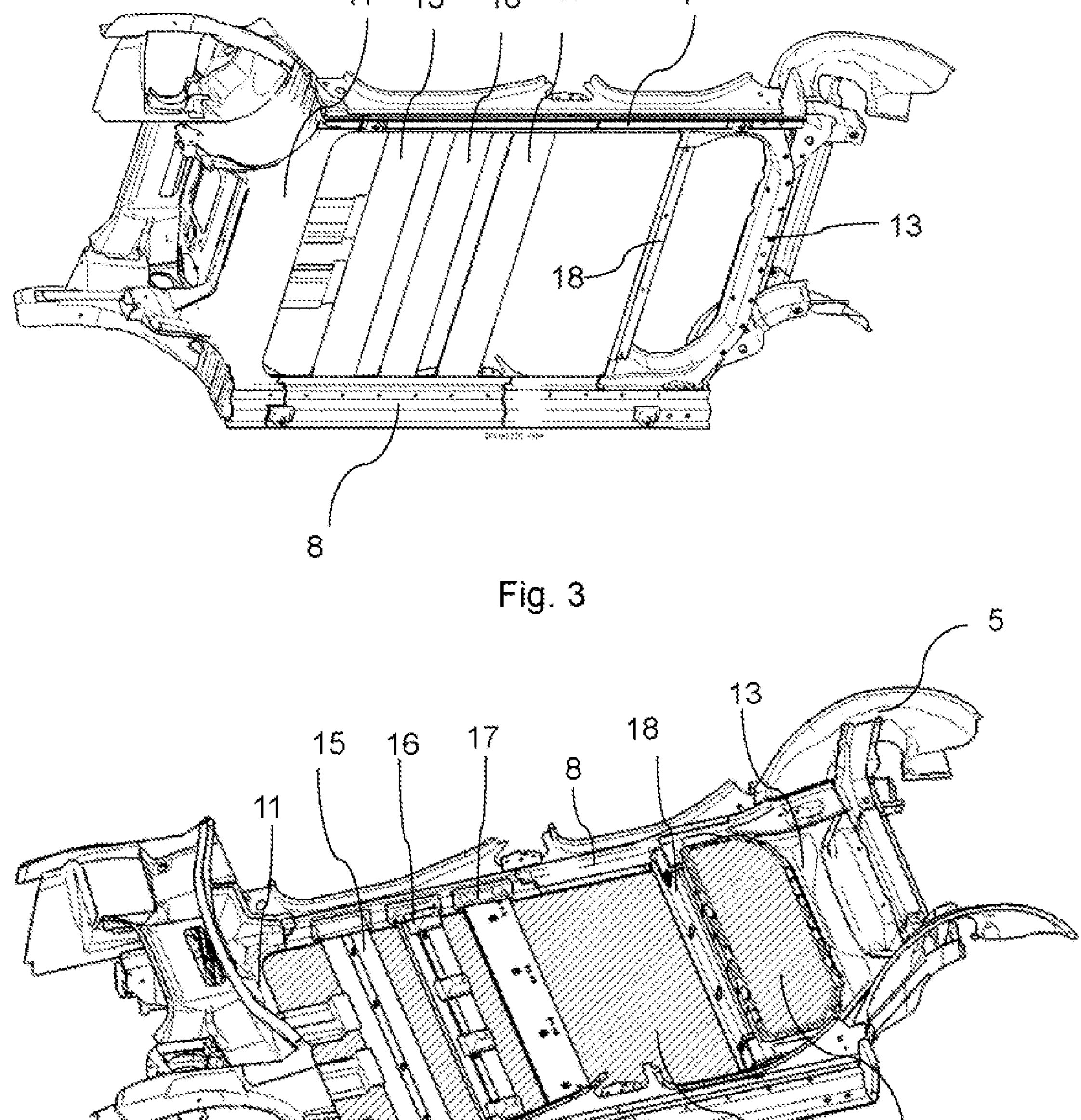
FIG. 4 schematically shows a perspective top view of the motor vehicle with the body and the drive energy accumulator after the drive energy accumulator has been fitted to the body according to the exemplary embodiment of the present invention.

FIG. 4 shows a perspective view of the floor assembly 5 with the fitted drive energy accumulator 3 obliquely from above. The hatched areas between the side sills 7 and 8 and the front crossmember structure 11 and the rear crossmember structure 13 of the floor assembly show a top side of the drive energy accumulator 3, in particular of the drive energy accumulator housing 301 and the additional housing 302, in the open regions between the respective members of the floor assembly 5. The top side of the drive energy accumulator 3 forms a floor of the passenger compartment 9 in the hatched regions and thus replaces a conventional floor plate. As also shown in FIG. 4, the drive energy accumulator 3 extends from a front crossmember structure 11 with an end wall as far as a rear crossmember structure 13, which connects rear ends of the side sills 7 and 8 to each other, i.e. as far as a rear wheel housing of the floor assembly 3 below a backseat bench, which forms the second row of seats.

Overall, a mounting sealing flange 306 of the drive energy accumulator housing 301 bears sealingly and circumferentially all around the corresponding constituent parts of the floor assembly 5, so that the drive energy accumulator housing 301 and the floor assembly 5, in an interacting manner, form a fluid-tight floor of the passenger compartment 9 of the motor vehicle. In this exemplary embodiment, the circumferential mounting sealing flange 306 is located in a sealing plane.

In comparison to a conventional floor assembly of a body, the floor assembly 5 does not have a floor plate and therefore has clearances between the adjacent crossmembers/crossmember structures. These clearances are closed off by the drive energy accumulator housing 301. In the present exemplary embodiment, 65% of the floor assembly 5 between the front crossmember structure 11 and the heel plate member 18, without the drive energy accumulator housing 301 between the side sills 6, 7 and the crossmember structures 11 and 13, is open at the bottom.

The drive energy accumulator 3 has, in addition to the drive energy accumulator housing 301, the additional housing 302, which is mounted on the drive energy accumulator housing 301 in the rear region of the drive energy accumulator housing 301, in the region below the backseat bench, that is to say behind the heel plate crossmember 18. Chargers, converters and electrical/electronic components of the drive energy accumulator 3 are accommodated in the additional housing 302. The additional housing 302 projects into the intermediate space between the heel plate crossmember 18 and the rear crossmember structure 13. A top side of the drive energy accumulator housing 301 is substantially flat. As shown in FIG. 2, the drive energy accumulator housing is formed from a housing bottom part 303 and a housing top part 305, the housing bottom part 303 having a housing bottom part flange 304 and the housing top part 305 having a housing top part flange 306, the housing bottom part 303 and the housing top part 305 being connected to each other via the housing bottom part flange 304 and the housing top part flange 306, and the housing top part flange 306 being designed for fitting the drive energy accumulator housing 303 to the floor assembly 5. A seal 307 is arranged between the housing top part flange 306 and the housing bottom part flange 304. A seal 19 is also arranged between the housing top part flange 306 and the floor assembly 5.

The drive energy accumulator housing 301 is connected to the floor assembly 5 by means of the screw connections 21 via the mounting sealing fans 304, 306. The drive energy accumulator housing 301 or the housing top part 306 is also connected to the crossmembers 15, 16, 17, 18 by means of the screw connections 23.

Figure 5:
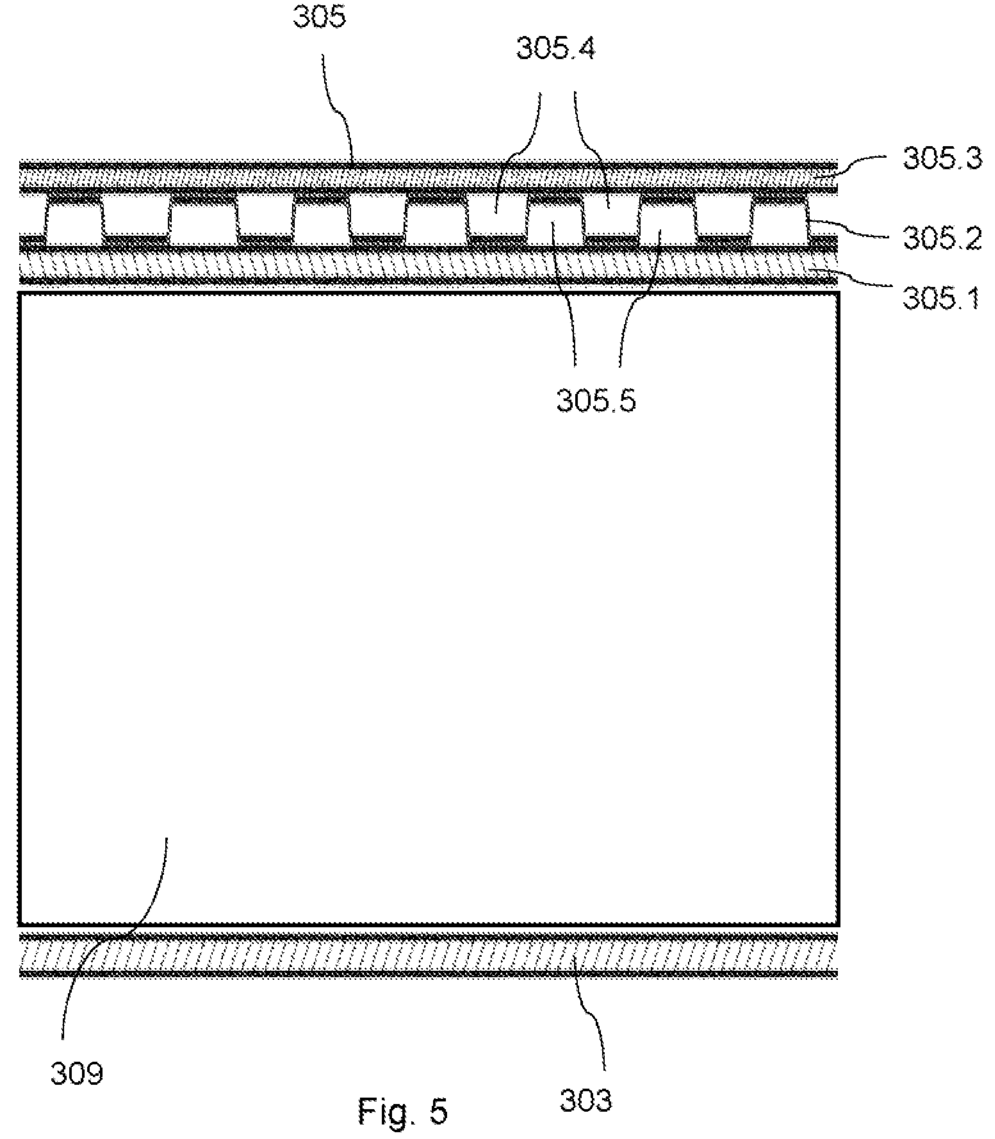
FIG. 5 schematically shows a sectional view of the drive energy accumulator according to the exemplary embodiment of the present invention.

FIG. 5 shows a schematic sectional view of the drive energy accumulator 3 parallel to a vertical axis of the passenger motor vehicle. The housing top part 305 forms an upper wall of the drive energy accumulator 3. The housing bottom part 303 forms a lower wall of the drive energy accumulator 3. Battery cells 9 are arranged between the housing bottom part 303 and the housing top part 305. In particular, the battery cells 9 are adhesively bonded to the housing top part 305, i.e. to the upper wall.

The housing upper part 305, i.e. the upper wall, is embodied as a heat exchanger. In particular, the heat exchanger 305 consists of a lower layer or plate 305.1 and an upper layer or plate 305.3, between which a corrugated layer 305.2 is arranged. The layers 305.1, 305.2 and 305.3 are cohesively connected to each other by adhesive bonding or welding. Feed channels 305.4 and return channels 305.5 are formed as a result. The channels 305.4 and 305.5 form channels of the heat exchanger through which a temperature-control medium can flow. The heat exchanger 305 thus provides floor heating or cooling of the passenger compartment. However, at the same time, the heat exchanger also provides heating or cooling of the battery cells 309, which adjoin the heat exchanger 305. In addition, the heat exchanger 305, as the base of the additional housing 302, provides temperature control of the additional housing 302, i.e. the electrical/electronic components arranged therein. The heat exchanger 305 is connected to a vehicle air-conditioning system via corresponding pipelines. In the vehicle air-conditioning system, a temperature-control medium is adjusted to a specific temperature and then fed to the heat exchanger. The temperature of the passenger compartment 9 and at the same time of the battery cells 309 can then be controlled by way of the temperature of the temperature-control medium or its throughflow quantity per unit time. For reasons of simplicity, the sectional view of FIG. 2 does not show the heat exchanger in the housing top part 305.

The floor of the passenger compartment 9, and thus also the heat exchanger 305, is clad or covered with an adequately thermally conductive floor cladding, e.g. a carpet or the like, so that adequate heat transfer into the passenger compartment 9 is possible.

The heat exchanger 305 controls the temperature of the passenger compartment 9 merely supplementarily. In addition, the vehicle air-conditioning system also exhibits conventional air-conditioning via air inlets in the passenger compartment 9. Since the heat exchanger 305, as surface temperature control, is subject to greater inertia than air temperature control, the heat exchanger 305 can contribute to basic temperature control, while the conventional air-conditioning via air inlets supplementarily allows more rapid control of the temperature in the passenger compartment 9.

Similarly, the heat exchanger 305 can merely supplementarily control the temperature of the battery cells 309. Further heat exchangers having their own temperature-control circuits between the battery cells 309 or/and below the battery cells 309 can be provided. This is advantageous for greater temperature control performance for controlling the temperature of the battery cells 309 and when there is an excessive difference between a target temperature of the battery cells and a target temperature of the passenger compartment.

The heat exchanger 305 is also embodied in such a way that it, together with the other constituent parts of the drive battery 3, contributes to a body rigidity for a driving mode of the motor vehicle and to a body strength for a collision load situation. In particular, the constituent parts of the drive battery 3, including the heat exchanger 305 and the battery cells 309, are adhesively bonded to each other in a sandwiched manner. The battery cells 309 are, for example, a large number of circular-cylindrical cells which are arranged adjoining each other and the end sides of which are adhesively bonded to the heat exchanger 305.

What is claimed is:

1. A motor vehicle, comprising:

a body with a passenger compartment;

a drive energy accumulator, wherein the drive energy accumulator is arranged on the body from below and at least partially forms a floor of the passenger compartment; and a temperature-control device, wherein a part of the drive energy accumulator that forms the floor of the passenger compartment is configured as a heat exchanger for controlling the temperature of the passenger compartment via the temperature-control device.

2. The motor vehicle according to claim 1, wherein the temperature-control device is additionally configured to control the temperature of the drive energy accumulator.

3. The motor vehicle according to claim 2, wherein the temperature-control device is additionally configured to control the temperature of battery cells of the drive energy accumulator.

4. The motor vehicle according to claim 2, wherein the heat exchanger is designed both to control the temperature of the drive energy accumulator and to control the temperature of the passenger compartment.

5. The motor vehicle according to claim 1, wherein the heat exchanger forms an upper wall of a drive energy accumulator housing of the drive energy accumulator.

6. The motor vehicle according to claim 1, wherein the heat exchanger has a large number of channels through which a liquid temperature-control medium flows, wherein a temperature of the temperature-control medium is controlled by the temperature-control device.

7. The motor vehicle according to claim 1, wherein the body has a floor assembly with a left-hand-side longitudinal member and a right-hand-side longitudinal member, and also a front crossmember structure and a rear crossmember structure, and the drive energy accumulator is fitted to the longitudinal members and the crossmember structures so as to seal off the passenger compartment from below.

8. The motor vehicle according to claim 7, wherein the floor assembly has, between the front crossmember structure and the rear crossmember structure, at least one further crossmember which is connected to the left-hand-side longitudinal member and to the right-hand-side longitudinal member.

9. The motor vehicle according to claim 8, wherein the at least one further crossmember is a seat crossmember and/or a heel plate crossmember.

10. The motor vehicle according to claim 8, wherein the heat exchanger forms the floor of the passenger compartment between the longitudinal members and the crossmember structures.

11. The motor vehicle according to claim 1, wherein the drive energy accumulator including the heat exchanger, is configured and connected to the body so as to increase a body rigidity for a driving mode of the motor vehicle and to increase a body strength for a collision load situation.

12. The motor vehicle according to claim 1, wherein the temperature-control device, together with the heat exchanger, is a constituent part of a vehicle interior climate-control system which comprises additional climate-control devices.

* * * * *